(12) United States Patent
Mori et al.

(10) Patent No.: US 6,646,034 B2
(45) Date of Patent: Nov. 11, 2003

(54) POLYACETAL RESIN COMPOSITION AND FRAGRANCE-EMITTING SHAPED ARTICLE

(75) Inventors: Hiroshi Mori, Tochigi (JP); Yosuke Fukada, Tokyo (JP); Masanori Yoshida, Toyama (JP)

(73) Assignees: E. I. du Pont de Nemours and Company, Wilmington, DE (US); YKK Corporation, Tokyo (JP)

( * ) Notice: Subject to any disclaimer, the term of this patent is extended or adjusted under 35 U.S.C. 154(b) by 0 days.

(21) Appl. No.: 10/169,677

(22) PCT Filed: Jan. 5, 2001

(86) PCT No.: PCT/US01/00368
§ 371 (c)(1),
(2), (4) Date: Jul. 1, 2002

(87) PCT Pub. No.: WO01/51561
PCT Pub. Date: Jul. 19, 2001

(65) Prior Publication Data
US 2003/0055143 A1 Mar. 20, 2003

(51) Int. Cl.[7] .............................. C08K 5/38; C08K 5/09; C08K 5/07
(52) U.S. Cl. ...................... 524/201; 524/249; 528/296; 528/361
(58) Field of Search .................. 524/201, 249; 528/296, 361

(56) References Cited

U.S. PATENT DOCUMENTS 5,578,563 A * 11/1996 Trinh et al. .................. 510/513

* cited by examiner

Primary Examiner—Kriellion A. Sanders

(57) ABSTRACT

The invention provides fragrance-emitting shaped articles such as slide fasteners which retain the various characteristics inherent to polyacetal resins. Shaped articles such as the row of engaging teeth, top end stop and bottom end stop or separable end stop assembly for a slide fastener are manufactured from a resin composition comprising a polyacetal resin and a fragrance material having an aldehyde group-free chemical structure and a boiling point which is at least as high as the polyacetal resin processing temperature.

16 Claims, 2 Drawing Sheets

POLYACETAL RESIN COMPOSITION AND FRAGRANCE-EMITTING SHAPED ARTICLE

BACKGROUND OF THE INVENTION

The present invention relates to polyacetal resin compositions which can be used to make fragrance-emitting shaped articles, and to fragrance-emitting shaped articles such as slide fasteners. More specifically, the invention relates to polyacetal resin compositions which can be used to make fragrance-emitting shaped articles that retain the characteristics inherent to polyacetal resins, such as excellent mechanical properties, heat resistance, fatigue resistance, sliding resistance and chemical resistance, and to shaped articles made from such compositions.

Aromas are believed to have a healing effect on the mind by acting on the brain through the sense of smell. For example, much attention has been devoted recently to the relaxing and refreshing effects that can be achieved using aromatherapy.

Fragrances also have the effect of counteracting unpleasant odors. Techniques that have been widely used to this end include the use of fragrances as deodorants, which chemically react with the odoriferous molecules responsible for an unpleasant odor, as masking agents which overwhelm and in essence "hide" the unpleasant odor, and as modifiers which alter the nature of an odor, such as perfumes that modify body odors and make them appealing.

A large range of products have been developed for the purpose of achieving such effects. Even in the technical field relating to plastic shaped articles, fragrance-emitting shaped articles have been produced by the addition of fragrances to resin compositions. One such example is disclosed in JP-B 61-15827

Fragrance-emitting products have been developed also in the form of various types of fasteners widely used in garments and other applications. For example, JP-A 7-111,903 discloses a type of fastener in which a specific low-boiling fragrance material has been directly impregnated into the fabric pieces on the loop side and/or hook side of the fastener.

Polyacetal resins are produced by polymerization primarily from formaldehyde monomer or from a starting material composed principally of trioxane, which is a formaldehyde trimer. Because of their excellent mechanical properties such as tensile strength and rigidity, and their excellent fatigue resistance, sliding resistance and chemical resistance, polyacetal resins are widely used in a variety of mechanical parts, electrical and electronics components, sliding parts and mechanisms for automotive and other applications, and fasteners.

However, polyacetal resins are exposed to high temperatures and placed in a molten state during melt processing operations such as extrusion or injection molding, at which time thermal degradation (such as thermal depolymerization) may arise. Such thermal degradation generates an irritating formaldehyde odor during extrusion or injection molding or from the shaped article, which can adversely affect the working environment and become an obstacle to the work itself. Moreover, formaldehyde may accumulate within the shaped articles, compromising the properties of the finished product.

Many solutions have been proposed for reducing the decomposition of polyacetal resins when molten and suppressing the amount of formaldehyde generated, or for reducing the formaldehyde odor that arises from shaped articles during solidification and cooling.

For example, JP-A 8-41288 discloses a polyacetal resin composition which includes an active imino group-bearing organic cyclic compound so as to lower the concentration of formaldehyde released from the polyacetal resin.

When, however, an aldehyde group-bearing fragrance material of the type disclosed in the foregoing publication, such as vanillin or dibenzalsorbitol, is added to a polyacetal resin for the purpose of imparting a fragrance to shaped articles such as fasteners manufactured from the resin, the aldehyde group-bearing fragrance material reacts with the formaldehyde that arises in the polyacetal resin during processing to produce formic acid. The formic acid accelerates thermal degradation of the molten polyacetal resin, further increasing the pungent formaldehyde odor.

Also, the addition to the polyacetal resin of a fragrance material having a boiling point lower than the melt processing temperature of the polyacetal or the composition results in the melting or vaporization and release of the fragrance during the extrusion or injection molding operation. The fragrance may then be too strong, becoming instead an unpleasant odor, or may form an unpleasant odor in association with formaldehyde released due to thermal degradation of the polyacetal resin during the processing operation. In either case, the results include a decline in the quality of the work environment and a reduction in the fragrance-emitting effect of the shaped article.

Therefore, one object of the invention is to provide a shaped article capable of emitting a desired fragrance while retaining the excellent properties inherent to polyacetal resins, such as mechanical properties, heat resistance, fatigue resistance, sliding resistance and chemical resistance, which shaped article preferably has a minimal concentration of formaldehyde. Another object of the invention is to provide a resin composition which can be used to make such shaped articles. A further object of the invention is to provide a method of manufacturing such shaped articles.

SUMMARY OF THE INVENTION

It has been discovered that adding a fragrance material having an aldehyde group-free chemical structure to the polyacetal resin makes it possible to provide shaped articles which emit a desired fragrance while yet retaining the excellent properties inherent to polyacetal resins, such as mechanical properties, heat resistance, fatigue resistance, sliding resistance and chemical resistance.

Accordingly, the invention provides a polyacetal resin composition comprising a polyacetal resin and a fragrance material having an aldehyde group-free chemical structure.

In the foregoing polyacetal resin composition of the invention, the fragrance material preferably has a boiling point which is at least as high as the polyacetal resin processing temperature.

In either of the foregoing polyacetal resin compositions of the invention, the fragrance material preferably has a chemical structure which includes a functional group that reacts with aldehyde groups in the polyacetal resin.

In any one of the foregoing polyacetal resin compositions of the invention, the content of the fragrance material, based on the overall weight of the resin composition, is preferably 0.001 to 1.0% by weight.

Any of the foregoing polyacetal resin compositions of the invention preferably also includes 0.001 to 5% by weight of a formaldehyde scavenger, based on the overall weight of the resin composition. The formaldehyde scavenger may be one which chemically fixes formaldehyde in the cooling step during processing of the resin composition, and also at normal temperature.

Another embodiment of the invention provides a fragrance-emitting shaped article made from any one of the foregoing polyacetal resin compositions.

The fragrance-emitting shaped article of the invention is manufactured from the foregoing polyacetal resin composition. The composition includes a fragrance material that may contain a functional group reactive with aldehyde groups in the polyacetal resin, or that may contain 0.001 to 5% by weight of a formaldehyde scavenger (based on the overall weight of the resin composition) wherein the formaldehyde scavenger chemically fixes formaldehyde in the cooling step during shaping of the resin composition, and also at normal temperature. The concentration of formaldehyde released from the resulting shaped article is not more than 25 ppm at normal temperature.

A further embodiment of the invention provides a slide fastener chain, wherein a row of engaging teeth is shaped from any one of the foregoing resin compositions.

A still further embodiment of the invention provides a slide fastener wherein any one or more members from the group consisting of a row of engaging teeth, a slider, a top end stop and a bottom end stop is shaped from any one of the foregoing resin compositions.

An additional embodiment of the invention provides a slide fastener wherein a separable end stop assembly comprising a pivot pin, a box pin and a box is shaped from any one of the foregoing resin compositions.

Yet another embodiment of the invention provides a method of manufacturing fragrance-emitting shaped articles, which method comprises incorporating a fragrance material having an aldehyde group-free chemical structure when making the polyacetal resin-containing shaped article.

The shaped articles of the invention, typical examples of which include the slide fasteners described above, emit a fragrance and are thus capable of serving as a pleasant aromatic source while retaining the outstanding mechanical properties, heat resistance, fatigue resistance, sliding resistance, chemical resistance and other characteristics inherent to polyacetal resins. The further addition of a formaldehyde scavenger enables the production of shaped articles which have even better aromaticity and suppress the release of formaldehyde.

The invention also provides resin compositions from which such shaped articles can be produced, and a method of manufacturing shaped articles that emit fragrance more effectively.

Figure 1:
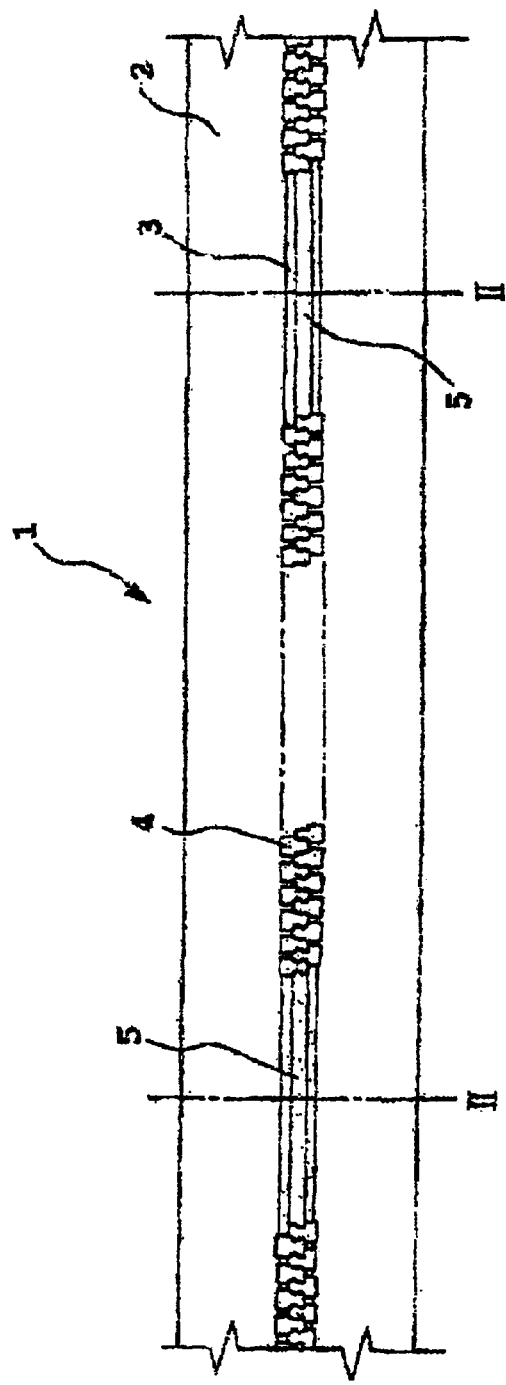
FIG. 1 is a top view showing part of a slide fastener chain according to one embodiment of the invention.

Explanation of the Reference Symbols
1: Slide fastener chain
2: Fastener tape
3: Fastener stringer
4: Row of engaging teeth
5: Space
6: Slide fastener
7: Top end stop
8: Slider
9: Bottom end stop
10: Separable end stop assembly
11: Pivot (or insertion, guide or separable) pin
12: Box pin
13: Box

DETAILED DESCRIPTION OF THE INVENTION

The polyacetal resin used in the invention is preferably a conventional polyacetal resin which is prepared by polymerizing or copolymerizing an aldehyde, typical examples of which include formaldehyde, the cyclic oligomers of formaldehyde (trioxane and tetraoxane), acetaldehyde and propylenealdehyde, or by copolymerizing the above aldehydes with a cyclic ether or a cyclic acetal, typical examples of which include ethylene oxide, propionoxide and 1,3-dioxolane. It is advantageous for the polyacetal resin thus prepared to be a linear polymer in which the backbone is composed of $—(CH_2)_n O—$ units (wherein n is a positive integer) and/or $—(CHR—O)_n—$ units (wherein R is alkyl and n is a positive integer), and which is protected with such groups as $—OCOCH_3$, $—CH_3$ and $—O(CH_2)OH$. The number average molecular weight is preferably from 10,000 to 100,000, and most preferably from 20,000 to 70,000.

The fragrance material added to the above-described polyacetal resin to produce the composition does not contain an aldehyde group by reason of being, in it chemical structure, free of aldehyde groups. Aldehyde group-bearing fragrance materials which can be used without difficulty in resin compositions other than polyacetal resins do, when used together with polyacetal resins, react with formaldehyde given off by the polyacetal resin during processing to produce formic acid. The resulting formic acid accelerates the thermal degradation of the molten polyacetal resin, leading to further generation of the irritating formaldehyde odor. For this reason, fragrance materials containing aldehyde groups must not be used in the polyacetal resin compositions of the invention.

If the fragrance material added to the polyacetal resin has a boiling point lower than the melt processing temperature of the polyacetal or the composition, the fragrance material will typically melt or vaporize during extrusion or injection molding and may give off an aroma which is so intense as to be unpleasant. The melt processing temperature of the polyacetal resin or composition is generally at least about 250° C. The aroma may also mix with the formaldehyde odor arising from the thermal degradation of the polyacetal resin in the processing step to create an unpleasant odor which has an adverse effect on the work environment and lowers productivity. Another undesirable effect of a low fragrance material boiling point may be to reduce the fragrance-emitting effect of the shaped article. It is therefore advantageous for the fragrance material to have a boiling point which is at least as high as the polyacetal resin processing temperature, and preferably at least about 250° C.

Fragrance materials that may be used in the invention include those selected for the purpose of imparting a fragrance to the shaped article, as well as those used for the purpose of imparting a deodorizing effect such as eliminating offensive or undesirable odors. The fragrance material is a fragrance-emitting or redolent compound or additive, the characteristic nature of which is to emit a pleasing bouquet, scent or aroma, such as that given off by a perfume or floral essence. Examples of fragrance materials suitable for use in the resin compositions of the invention include benzyl benzoate, ethylene brassilate, eugenol, coumarin, cinnamyl alcohol, methyl cinnamate, isoeugenol acetate, eugenol acetate, cinnamyl acetate, diphenyl ether, methyl N-methylanthranilate and ethyl methylphenylglycidate.

The fragrance material may be synthesized or of natural origin. Two or more such fragrance materials may be used in combination. The above fragrance materials are generally available commercially as mixtures of two or more thereof in an alcohol solution. Suitable use may be made of such commercial preparations.

To the extent that the fragrance-emitting effect of the shaped article is not impaired, a fragrance material having an aldehyde group-containing chemical structure may, if desired, be used in admixture with the above-described fragrance material having an aldehyde group-free chemical structure.

Fragrance materials especially suitable for use in the resin compositions of the invention include those having a chemical structure which does not contain aldehyde groups but does include functional groups that react with aldehyde groups in the polyacetal resin. The use of a fragrance material containing functional groups that react with aldehyde groups in the polyacetal resin has the dual effect of imparting a fragrance to the shaped article and reducing the concentration of formaldehyde released by the shaped article. The presence of such a fragrance material is able to reduce the concentration of formaldehyde given off by the shaped article at normal temperature to 25 ppm or less. Normal temperature in the context of this invention is, for example, ambient temperature, or room temperature (such as about 25° C.).

Examples of functional groups which react with the aldehyde groups in the polyacetal include hydroxyl, methoxy and glycidyl groups. A fragrance material having a chemical structure in which these have been substituted on the aromatic ring is especially preferred. Examples of such fragrance materials include eugenol, isoeugenol and ethyl methylphenylglycidate.

A fragrance material having a chemical structure which contains no aldehyde groups but contains functional groups that react with aldehyde groups in the polyacetal resin may be used in combination with a fragrance material having a chemical structure which has neither aldehyde groups nor functional groups that react with aldehyde groups in the polyacetal resin.

The content of the fragrance material in the resin composition varies depending on the type of fragrance material, although the desired fragrance can generally be achieved at a content of typically 0.001 to 1.0% by weight, and preferably about 0.01 to 0.1% by weight, based on the overall weight of the polyacetal resin composition. The addition of too little fragrance material gives the shaped article a poor aromaticity, whereas the addition of too much may make the fragrance of the shaped article so powerful as to be instead unpleasant, and moreover may diminish the physical properties of the material.

The resin composition of the invention preferably also contains a formaldehyde scavenger in order to reduce the concentration of formaldehyde gas released from the polyacetal resin. Including a formaldehyde scavenger in the resin composition enables the concentration of formaldehyde released from the shaped article to be reduced to not more than 25 ppm at normal temperature.

The formaldehyde scavenger is most preferably one which efficiently fixes formaldehyde chemically in the cooling step when the resin composition is processed, and also at normal temperature. The scavenger fixes the formaldehyde by a reaction in which a chemical bond is created between the formaldehyde and the scavenger molecule. Exemplary substances capable of effectively reacting with formaldehyde to fix it include nitrogen-containing organic compounds having an amino or imino group. Illustrative examples include aminoethyl alcohol, aminomethyl propanol, dimethylaminomethyl propanol, aminobutanol, aminoethyl propanediol, tris(hydroxymethyl) aminomethane, cyclohexylamine, diethylaminomethyl propanol, p-aminobenzoic acid, methyl p-aminobenzoate, ethyl p-aminobenzoate, p-aminobenzoic acid amide, o-aminobenzoic acid, methyl o-aminobenzoate, ethyl o-aminobenzoate, o-aminobenzoic acid amide, adipic acid hydrazide, hydantoin, 5,5'-dimethylhydantoin, 5,5'-diphenylhydantoin, 1-hydroxymethyl-5,5'-dimethylhydantoin, oxalic acid hydrazide and hydantoin-5-ureido. These may be used singly or as mixture of two or more thereof.

The content of formaldehyde scavenger in the resin composition of the invention, when present, is preferably 0.001 to 5% by weight, and more preferably 0.02 to 0.1% by weight, based on the overall weight of the resin composition. Too little formaldehyde scavenger may result in a low formaldehyde concentration reducing effect, whereas too much may diminish the physical properties of the resin composition or result in the formation of mold deposits.

If necessary, other additives commonly used in polyacetal resins, such as heat stabilizers, antioxidants, plasticizers, lubricants, fillers and colorants may be added to the polyacetal resin composition of the invention insofar as the objects and effects of the invention are attainable.

The fragrance material may be added at any stage during preparation of the polyacetal resin composition and production of the shaped article. That is, it may be added together with the various additives when these are mixed into the polyacetal resin, it may be added to the molten polyacetal resin when the mixture of the above constituents is melted and worked to produce resin pellets, or it may be added to the processing apparatus, such as an extruder or an injection molding machine, when the shaped articles are formed from the resin pellets.

However, because the shaped article is subjected to at least two heat excursions at 200° C. or above by the time production is complete, the fragrance material volatizes and is gradually released, which may lower the fragrance-imparting effect of the shaped article obtained as the finished product. Accordingly, addition of the fragrance material in the processing step is preferred, such as during the molding or shaping operation.

Alternatively, fragrance may be imparted by applying the fragrance material to the shaped article after it has been manufactured, although this approach is undesirable because the fragrance has poor sustainability in the service environment.

The formaldehyde concentration is best reduced at an early stage. Accordingly, it is effective to add the formaldehyde scavenger prior to resin pellet production; that is, when melt working the mixture of polyacetal resin and the various additives.

The shaped article may be produced from the polyacetal resin composition of the invention by any suitable known process, such as compression molding, injection molding, extrusion, blow molding, rotational molding, melt spinning and thermoforming. Injection molding is especially preferred for making small shaped articles such as fasteners.

The polyacetal resin composition of the invention is suitable for use in the production of shaped articles for a variety of uses, but is especially well-suited to the production of slide fasteners. FIG. 1 shows an embodiment of a slide fastener chain 1 according to the present invention. The slide fastener chain 1 is the form of a continuous body which is later cut into individual slide fasteners. Rows of engaging teeth 4, and spaces 5 which are free of rows of engaging teeth 4, are formed in alternation at given intervals along the length of the chain 1. The chain 1 is cut on cutting lines II in the spaces 5.

Figure 2:
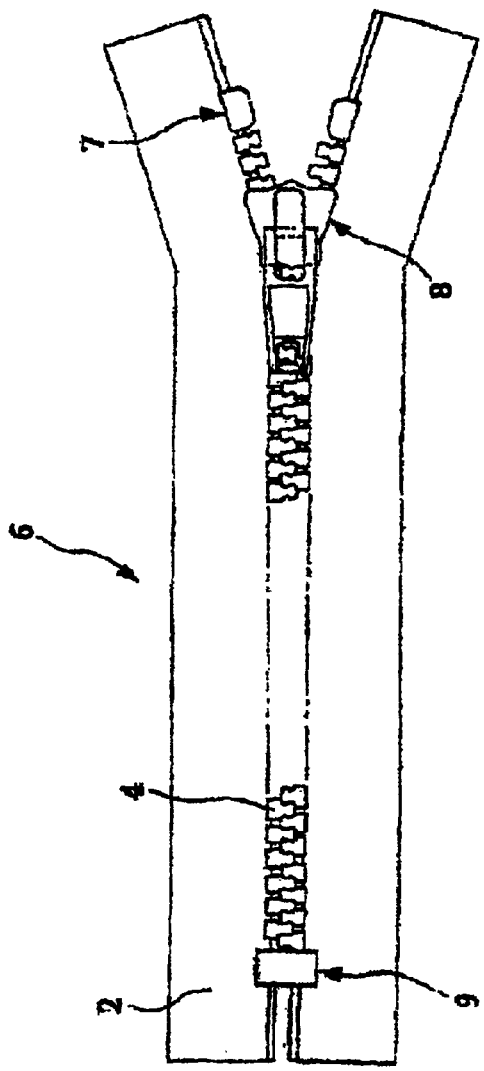
FIG. 2 is a top view showing a slide fastener according to another embodiment of the invention.
Figure 3:
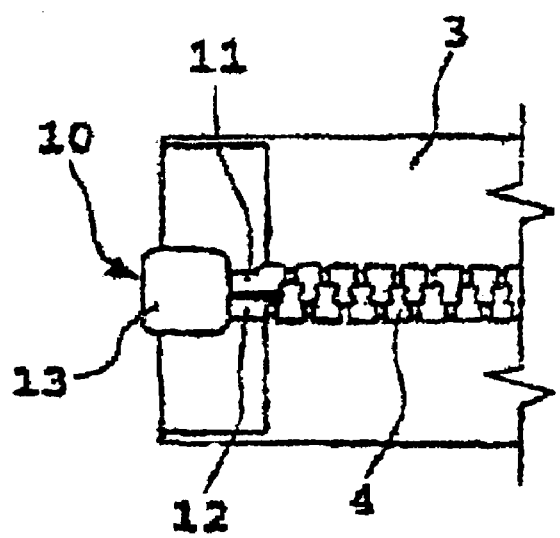
FIG. 3 is a top view showing the essential features of a slide fastener according to a further embodiment of the invention.

FIG. 2 shows an embodiment of a slide fastener 6 according to the invention. The slide fastener 6 has both a row of engaging teeth 4 disposed along the facing edges of a pair of fastener tapes 2, and a slider 8 which engages or separates the row of engaging teeth 4. Depending on its mode of use, the slide fastener 6 may also have a top end stop 7 and a bottom end stop 9 to restrict sliding movement of the slider. As shown in FIG. 3, instead of a bottom end stop 9, the slide fastener may have a separable end stop assembly 10 comprising a pivot (or insertion, guide or separable) pin 11, a box pin 12 and a box 13.

The row of engaging teeth 4 in the inventive slide fastener chain and slide fastener may be made of the resin composition according to the present invention.

Briefly described, the method of manufacturing the row of engaging teeth involves feeding a fastener tape between a pair of mold halves in which there are formed in the lengthwise direction a plurality of engaging teeth row-shaping cavities, closing the pair of mold halves, and filling the engaging teeth row-forming cavities with the resin composition discharged from an extruder or an injection molding machine, thereby forming a row of engaging teeth on the edge of the fastener tape.

In the slide fastener, any or all of the slider, top end stop, bottom end stop, separable end stop assembly or other parts may be made of the inventive resin composition. The slide fastener in which any or all of the plastic members are made of a resin composition containing a fragrance material having an aldehyde group-free chemical structure emits a fragrance at all times. Accordingly, the slide fastener constantly provides a pleasing aroma to someone wearing a garment or using an article on which it has been mounted, and can in this way impart a relaxing and refreshing aromatic effect.

When a fragrance material having a deodorizing effect is used, a garment to which the inventive slide fastener has been attached has a counteractive effect against offensive or undesirable odors.

Moreover, sliding the slider along the row of engaging teeth to engage or separate the teeth causes the surface of the row of teeth and the inner face of the slider through which the teeth pass to rub against each other, releasing to the air the aromatic constituent present within the row of engaging teeth and/or the slider and thereby intensifying the fragrance. In addition, sliding the slider along the row of engaging teeth and bringing it into contact with a top stop positioned at one end of the row of teeth, and/or a bottom stop or separable stop assembly positioned at the other end similarly causes release of the aromatic constituent to the air, thereby intensifying the fragrance.

When a slide fastener, or part thereof is made from the composition of this invention, the composition may be used for the various parts as follows:

a slide fastener chain containing a row of engaging teeth disposed along the facing edges of a pair of fastener tapes, wherein a row of engaging teeth is made from the composition;

a slide fastener containing a row of engaging teeth disposed along the facing edges of a pair of fastener tapes, wherein a row of engaging teeth is made from the composition;

a slide fastener containing a row of engaging teeth disposed along the facing edges of a pair of fastener tapes, and a slider which slides along the row of engaging teeth, causing the teeth to engage or separate, wherein the slider is made from the composition;

a slide fastener containing a row of engaging teeth disposed along the facing edges of a pair of fastener tapes, which row of teeth has at one end a top stop and has at the other end a bottom stop, wherein the top stop or the bottom stop or both are made from the composition; and a slide fastener containing a row of engaging teeth disposed along the facing edges of a pair of fastener tapes, which row of teeth has at one end a top stop and has at the other end a separable stop assembly comprised of a pivot pin, a box pin and a box, wherein the top stop or the separable stop assembly or both are made from the composition.

The resin composition according to the invention is not limited only to use in slide fasteners and slide fastener chains, but may be employed as well in a variety of small shaped articles, including snap fasteners, hook-and-loop fasteners, rail-type fasteners, buckles, swivels, cordlocks and key chains. The inventive resin composition can also be used to make various plastic items for construction applications, such as jambs, sashes and frames for windows, patio doors and Japanese shoji screens, and doorknobs, sliding door handles, "crescent" door handles and sash rollers for doors.

The following examples are given by way of illustration and are not intended to limit the invention.

The polyacetal resin used in the examples of the invention and comparative examples was a standard high-flow grade of polyacetal homopolymer with a number average molecular weight of 37,000 manufactured by Du Pont K.K. under the trade name Delrin™ 900P acetal polymer.

The fragrance material used in the respective examples are shown in Table 1 below.

TABLE 1

Fragrance Materials

| Type of fragrance material* | Aroma | Boiling point | Aldehyde group |
|---|---|---|---|
| A-1 PNSO 85095 | Cinnamon | 237° C. | No |
| A-2 PNSO 85134 | Coconut | 148° C. (20 mmHg) | No |
| A-3 Eugenol | Spice family | 255° C. | No |
| A-4 Isoeugenol | Rose | 266° C. | No |
| A-5 PNSO 85133 | Coconut + vanilla | >250° C. | Yes |
| A-6 Vanillin | Vanilla | 284° C. | Yes |

*Names given for A-1, A-2, A-5 are trade names.
A-1, A-2, A-5: Produced by Givaudan Roure K. K.
A-3, A-4: Produced by Midori Kagaku Co., Ltd.
A-6: Produced by Kanto Chemical Co., Inc.

The formaldehyde scavengers used in the respective examples are shown in Table 2.

TABLE 2

Formaldehyde Scavengers

| | Type |
|---|---|
| B-1 | Ethyl p-aminobenzoate |
| B-2 | 4,4-dimethylhydantoin |
| B-3 | Tris(hydroxymethyl)aminomethane |

B-1, B-3: Produced by Kanto Chemical Co., Inc.
B-2: Produced by Mitsui Chemicals, Inc.

EXAMPLES 1 TO 6, AND COMPARATIVE EXAMPLES 1 TO 9

In the respective examples, the formaldehyde scavenger shown in Table 2 was added in the proportion indicated in Table 3 to the polyacetal resin, following which the mixture was melted and worked in a 35 mm twin screw extruder manufactured by Toshiba Corporation, then extruded and cut to give pellets of the resin composition. Extrusion was carried out at a resin temperature of 210 to 230° C. and a feed rate of about 30 kg/h. The fragrance materials shown in Table 1 were added and mixed into the resulting resin pellets in the proportions indicated in Table 3, following which plate-like test pieces 5 cm long, 3 cm wide and 1.5 mm thick were fabricated using an injection molding machine. Molding was carried out at a resin temperature of 200° C. and a mold temperature of 80° C.

TABLE 3

Compounding Ratio of Resin Constituents

| | Polyacetal resin (wt %) | Fragrance material | | Formaldehyde scavenger | |
|---|---|---|---|---|---|
| | | Type | Amount (wt %) | Type | Amount (wt %) |
| Example 1 | 99.9 | A-1 | 0.1 | — | — |
| Example 2 | 99.9 | A-2 | 0.1 | — | — |
| Example 3 | 99.9 | A-3 | 0.1 | — | — |
| Example 4 | 99.9 | A-4 | 0.1 | — | — |
| Example 5 | 99.7 | A-2 | 0.1 | A-1 | 0.2 |
| Example 6 | 99.0 | A-4 | 1.0 | — | — |
| Comp. Ex. 1 | 100 | — | — | — | — |
| Comp. Ex. 2 | 99.95 | — | — | B-1 | 0.05 |
| Comp. Ex. 3 | 99.8 | — | — | B-1 | 0.2 |
| Comp. Ex. 4 | 99.5 | — | — | B-1 | 0.5 |
| Comp. Ex. 5 | 99.8 | — | — | B-2 | 0.2 |
| Comp. Ex. 6 | 99.8 | — | — | B-2 | 0.2 |
| Comp. Ex. 7 | 99.9 | A-5 | 0.1 | — | — |
| Comp. Ex. 8 | 99.0 | A-6 | 1.0 | — | — |
| Comp. Ex. 9 | 97.0 | A-6 | 3.0 | — | — |

The test pieces obtained in each example were subjected to aromaticity tests, formaldehyde concentration tests and thermal stability tests performed as described below. The results are given in Table 4.

Test Methods:

1) Aromaticity:

In each example, some 30 to 40 test pieces were placed in an aluminum foil-lined kraft paper bag, which was then sealed shut. The bag was held at normal temperature for 24 hours, after which the bag was opened, the test pieces were removed, and the aromaticity of the shaped pieces was determined.

2) Formaldehyde Concentration:

In each example, two test pieces were placed in a 300-ml polyethylene container, and the container was tightly closed. The container was held for 24 hours at normal temperature indoors, following which the formaldehyde concentration within the container was measured using a Mark II Formaldemeter (manufactured by Lion Laboratories of the U.K.).

Normal temperature in the context of this invention is, for example, ambient temperature, or room temperature (such as about 25° C.).

3) Melt Stability:

A predetermined weight of the polyacetal resin composition was held at 259° C. for 30 minutes in a nitrogen atmosphere, following which the weight loss was measured. The thermal stability index was calculated as shown below.

$$\text{Thermal Stability Index (\%)} = \frac{(\text{initial weight} - \text{weight after test})}{\text{initial weight}} \times 100$$

TABLE 4

Test results for aromaticity, formaldehyde concentration and thermal stability

| | Aromaticity (23° C.) | Formaldehyde concentration (23° C., ppm) | Thermal stability index (259° C., %) |
|---|---|---|---|
| Example 1 | Faint aroma | 21.1 | 0.25 |
| Example 2 | Coconut smell | 21.0 | 0.25 |
| Example 3 | Faint aroma | 15.1 | 0.20 |
| Example 4 | Faint rose aroma | 14.1 | 0.19 |
| Example 5 | Coconut smell | 3.1 | 0.18 |
| Example 6 | Floral family aroma | 7.9 | 0.18 |
| Comp. Ex. 1 | Formaldehyde smell | 28.0 | 0.23 |
| Comp. Ex. 2 | Odorless | 2.7 | 0.13 |
| Comp. Ex. 3 | Odorless | 1.3 | 0.12 |
| Comp. Ex. 4 | Odorless | 0.7 | 0.13 |
| Comp. Ex. 5 | Odorless | 2.0 | 0.28 |
| Comp. Ex. 6 | Odorless | 1.4 | 0.23 |
| Comp. Ex. 7 | Vanilla smell | 26.6 | 0.33 |
| Comp. Ex. 8 | Unpleasant vanilla smell | 46.3 | 0.72 |
| Comp. Ex. 9 | Unpleasant vanilla smell | 52.3 | 0.57 |

As is apparent from the results obtained in Examples 1 to 6 of the invention, fragrance-emitting molded articles can be obtained by adding a fragrance material having an aldehyde group-free chemical structure to a polyacetal resin, or by adding a fragrance material having an aldehyde group-free chemical structure to a polyacetal resin in which a formaldehyde scavenger is also incorporated.

The results obtained in Examples 2 and 5 show that the addition of a fragrance material having an aldehyde group-free chemical structure to a polyacetal resin in which a formaldehyde scavenger is also incorporated lowers the concentration of formaldehyde released by the molded article.

The results obtained in Examples 4 and 6 show that the concentration of formaldehyde released by the molded article is reduced by the use of a fragrance material which contains no aldehyde groups and carries a functional group that reacts with formaldehyde within the polyacetal resin.

The results obtained in Comparative Examples 7, 8 and 9 show that the use of a fragrance material having an aldehyde group-bearing chemical structure increases the amount of formaldehyde generated, and that increasing the amount of fragrance material added leads to the release of an unpleasant odor and lowers the thermal stability of the acetal resin.

EXAMPLE 7

The polyacetal resin, fragrance material and formaldehyde scavenger were formulated in the proportions shown in Table 5, and a pelletized resin composition was prepared by the same method as in the other examples of the invention.

TABLE 5

Proportions of Resin Molding Compositions

| | Polyacetal resin (wt %) | Fragrance material Type | Amount (wt %) | Formaldehyde scavenger Type | Amount (wt %) |
|---|---|---|---|---|---|
| Example 7 | 99.8 | A-2 | 0.1 | B-3 | 0.1 |

The pelletized resin composition was molded into the various slide fastener chains having rows of engaging teeth, essentially such as shown in FIGS. 1–3. The respective slide fastener chains were labeled as Samples 1 to 10, and a transverse tensile strength test was conducted on each of these slide fastener chains 1 in accordance with JIS S 3016. The results are shown in Table 6.

TABLE 6

Slide Fastener Chain Tensile Test Results

| | Chain width (mm) | Chain thickness (mm) | Head width (mm) | Pitch (mm) | Transverse strength (kg) |
|---|---|---|---|---|---|
| Sample 1 | 5.61 | 2.56 | 2.09 | 3.48 | 47.13 |
| Sample 2 | 5.60 | 2.57 | 2.08 | 3.48 | 45.54 |
| Sample 3 | 5.59 | 2.56 | 2.08 | 3.48 | 46.40 |
| Sample 4 | 5.65 | 2.56 | 2.08 | 3.48 | 47.72 |
| Sample 5 | 5.61 | 2.57 | 2.10 | 3.48 | 49.55 |
| Sample 6 | 5.61 | 2.57 | 2.07 | 3.48 | 46.79 |
| Sample 7 | 5.58 | 2.56 | 2.10 | 3.48 | 46.20 |
| Sample 8 | 5.60 | 2.55 | 2.08 | 3.48 | 48.67 |
| Sample 9 | 5.62 | 2.56 | 2.10 | 3.48 | 48.96 |
| Sample 10 | 5.62 | 2.55 | 2.10 | 3.48 | 45.42 |
| Average | 5.61 | 2.56 | 2.09 | 3.48 | 47.24 |
| Specification | 5.70± 0.14 | 2.60 (+0.10, −0.07) | 2.08± 0.05 | 3.50± 0.03 | 35.0 |

In all the samples tested, the transverse tensile strength of the slide fastener chain exceeded the specification value. These results demonstrate that the slide fastener chains according to the invention retain the excellent mechanical properties inherent to polyacetal resins.

What is claimed is:

1. A composition of matter comprising in admixture a polyacetal resin and a fragrance material that is, in its chemical structure, free of aldehyde groups.

2. A composition according to claim 1 wherein the fragrance material has a boiling point at least as high as the polyacetal resin processing temperature.

3. A composition according to claim 1 wherein the fragrance material contains a functional group that reacts with aldehyde groups in the polyacetal resin.

4. A composition according to claim 1 wherein the content of the fragrance material, based on the overall weight of the composition of matter, is 0.001 to 1.0% by weight.

5. A composition according to claim 1 wherein the fragrance material is one or more members of the group consisting of eugenol, isoeugenol and ethyl methylphenylglycidate.

6. A composition according to claim 1 further comprising a formaldehyde scavenger.

7. A composition according to claim 6 wherein the formaldehyde scavenger is present in an amount of 0.001 to 5% by weight, based on the overall weight of the composition of matter.

8. A composition according to claim 6 wherein the formaldehyde scavenger is one or more members of the group consisting of ethyl p-aminobenzoate, 5,5'-dimethylhydantoin and tris(hydroxymethyl)aminomethane.

9. A composition according to claim 6 wherein the formaldehyde scavenger fixes the formaldehyde by a reaction in which a chemical bond is created between the formaldehyde and scavenger molecule either in the cooling step during processing of the resin compound, or at normal temperature.

10. A composition according to claim 1 wherein the fragrance material is one or more members of the group consisting of eugenol, isoeugenol and ethyl methylphenylglycidate, and the composition further comprises a formaldehyde scavenger which is one or more members of the group consisting of ethyl p-aminobenzoate, 5,5'-dimethylhydantoin and tris(hydroxymethyl)-aminomethane.

11. A composition according to claim 1 in the form of a shaped article.

12. A shaped article according to claim 11 wherein the concentration of formaldehyde released by the shaped article is not more than 25 ppm at normal temperature.

13. A shaped article according to claim 11 which is a slide fastener, or a part thereof.

14. A method of manufacturing a fragrance-emitting shaped article comprising shaping the article from a composition comprising a polyacetal resin and a fragrance material having an aldehyde-free chemical structure.

15. A method according to claim 14 wherein the fragrance material is incorporated into the composition at the time of shaping.

16. A method according to claim 14 further comprising a step of incorporating a formaldehyde scavenger into the composition before the time of shaping.

* * * * *